(12) United States Patent
Heller et al.

(10) Patent No.: US 9,056,671 B2
(45) Date of Patent: Jun. 16, 2015

(54) FIXED WING OF AN AIRCRAFT

(71) Applicants: Airbus Operations GmbH, Hamburg (DE); Airbus Operations Ltd., Bristol (GB)

(72) Inventors: Gerd Heller, Hellwege (DE); Alexander Buescher, Bremen (DE); Frank Theurich, Hude (DE); Tom Gibson, Gloucestershire (GB); Michael Karwin, Weyhe (DE); Stephen Powell, Weston-Super-Mare (GB)

(73) Assignees: Airbus Operations GmbH, Hamburg (DE); Airbus Operations Ltd., Bristol (GB)

( * ) Notice: Subject to any disclaimer, the term of this patent is extended or adjusted under 35 U.S.C. 154(b) by 335 days.

(21) Appl. No.: 13/650,457

(22) Filed: Oct. 12, 2012

(65) Prior Publication Data

US 2013/0277504 A1    Oct. 24, 2013

(51) Int. Cl.
*B64C 23/06*    (2006.01)

(52) U.S. Cl.
CPC ............. *B64C 23/065* (2013.01); *Y02T 50/164* (2013.01)

(58) Field of Classification Search
USPC .............................................. 244/35 R, 199.4
See application file for complete search history.

(56) References Cited

U.S. PATENT DOCUMENTS

| | | |
|---|---|---|
| 5,102,068 A | 4/1992 | Gratzer |
| 5,348,253 A | 9/1994 | Gratzer |
| 2002/0162917 A1 | 11/2002 | Heller et al. |
| 2007/0018049 A1 | 1/2007 | Stuhr |
| 2007/0131821 A1 | 6/2007 | Johan |
| 2010/0019094 A1 | 1/2010 | Theurich et al. |

FOREIGN PATENT DOCUMENTS

| | | |
|---|---|---|
| CN | 1720167 A | 1/2006 |
| CN | 101214853 A | 7/2008 |
| CN | 101535124 A | 9/2009 |
| DE | 101 17 721 | 10/2002 |
| JP | 2009/501678 | 1/2009 |
| JP | 2010/510118 | 4/2010 |
| WO | WO 02/47979 | 6/2002 |
| WO | WO 2007/068947 | 6/2007 |
| WO | WO 2008/061739 | 5/2008 |
| WO | WO 2009/155584 | 12/2009 |
| WO | WO 2011/127938 | 10/2011 |

OTHER PUBLICATIONS

Korean Office Action for Application No. 10 2012 7029601 dated Jan. 7, 2014.

(Continued)

*Primary Examiner* — Brian M O'Hara
*Assistant Examiner* — Keith L Dixon
(74) *Attorney, Agent, or Firm* — Jenkins, Wilson, Taylor & Hunt, P.A.

(57) ABSTRACT

A fixed wing of an aircraft, having a main wing extending over a half-span with a wing box including spars extending along the spanwise direction of the main wing, ribs arranged one in back of the other viewed in the spanwise direction, and an outer skin. The wing box includes a wing box base section (K10) and a wing box adapter section, that forms the outer end area of the wing box, as viewed from the wing root, and is designed to secure a wing tip device. In its nominal state of construction, the dihedral angle of the wing box adapter section referring to the respective local spanwise direction continuously increases by at most 60 degrees from the outer rib of the wing box base section (K10) up to the outermost rib of the wing box adapter section.

17 Claims, 4 Drawing Sheets

(56) References Cited

OTHER PUBLICATIONS

German Office Action for Application No. 10 2010 014 633.1 dated Nov. 7, 2013.
Australian Office Action for Application No. 2010350897 dated Apr. 24, 2014.
Japanese Office Action for Application No. 2013-504123 dated Jan. 28, 2014.
International Search Report for App No. PCT/EP2010-022550 (WO2011-127938) dated Dec. 7, 2010.
Chinese Office Action for Application No. 201080067356.7 dated Aug. 5, 2014.

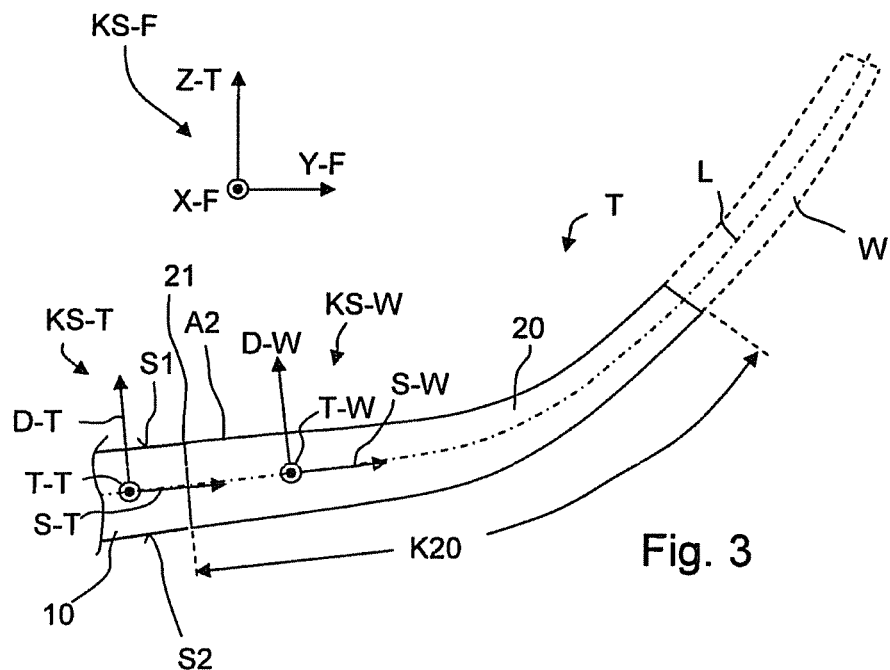
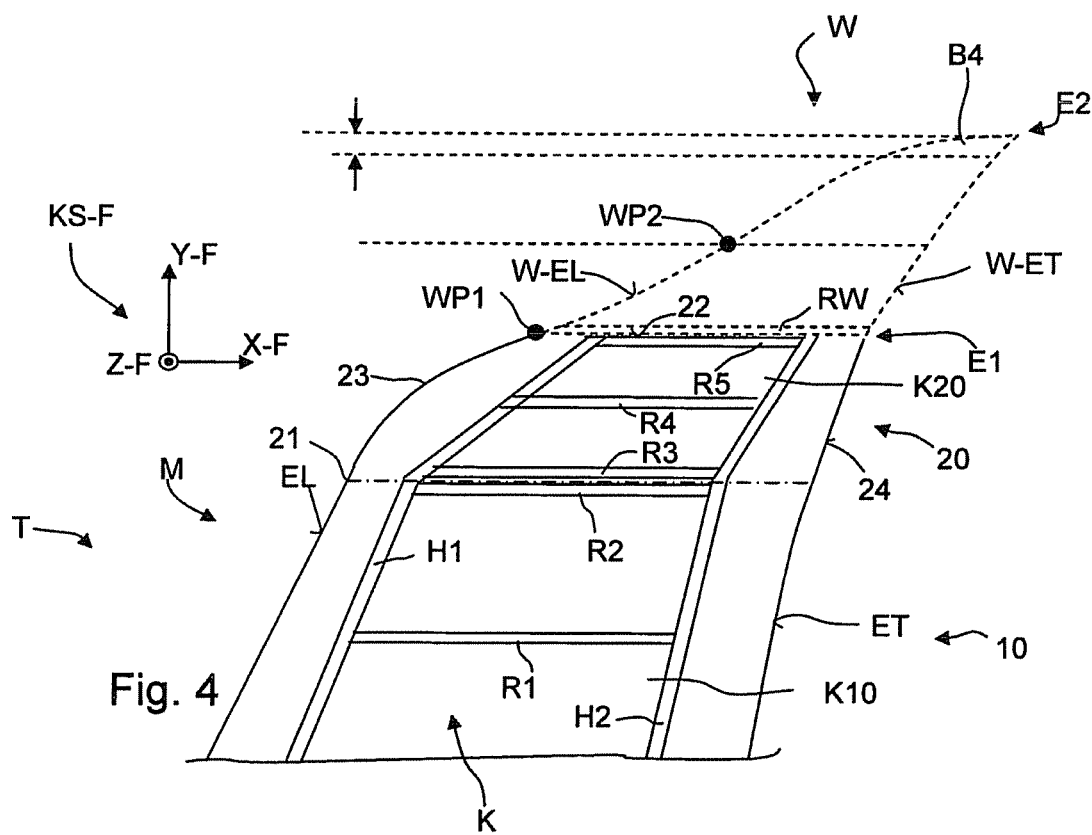

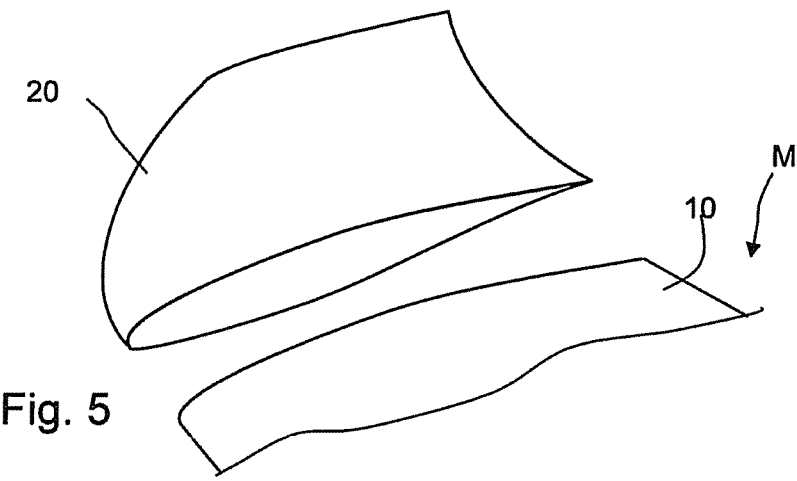
Fig. 5
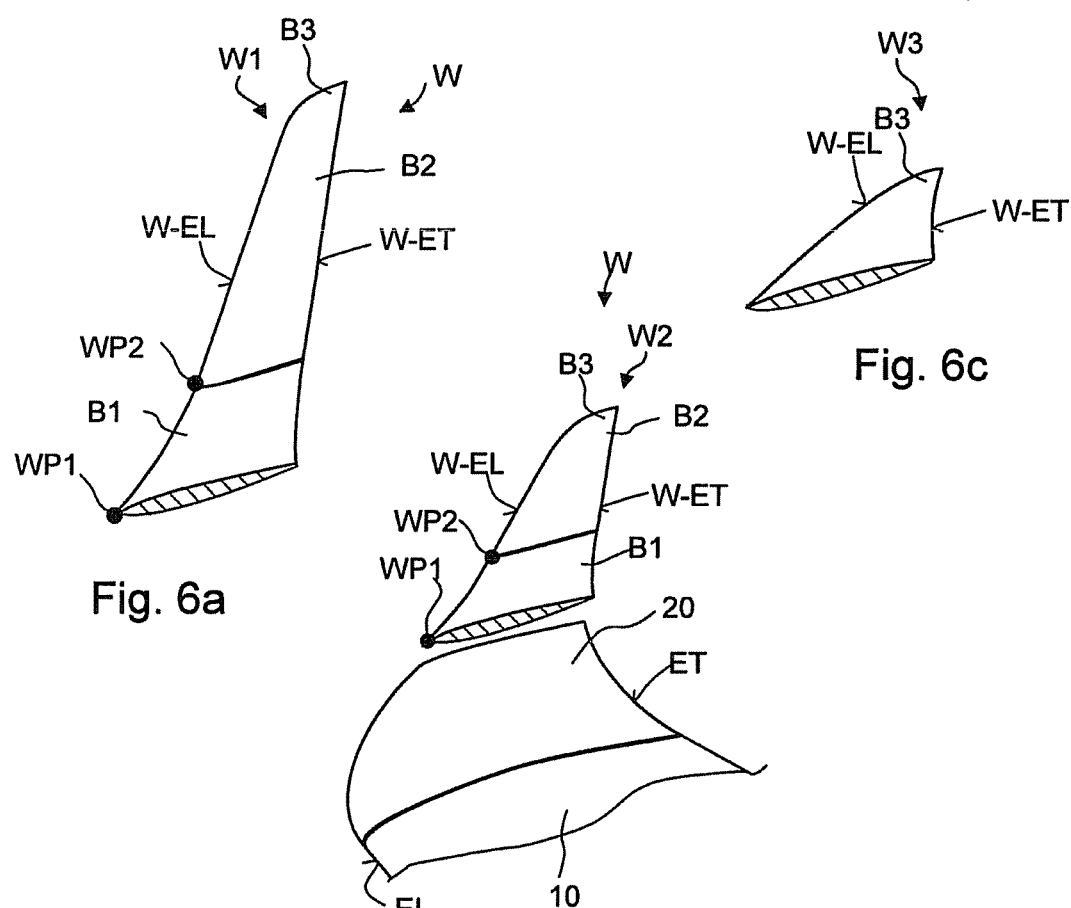
Fig. 6a
Fig. 6b
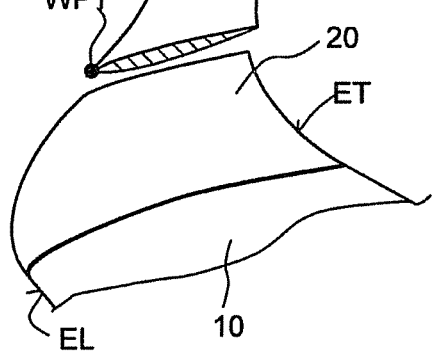
Fig. 6c

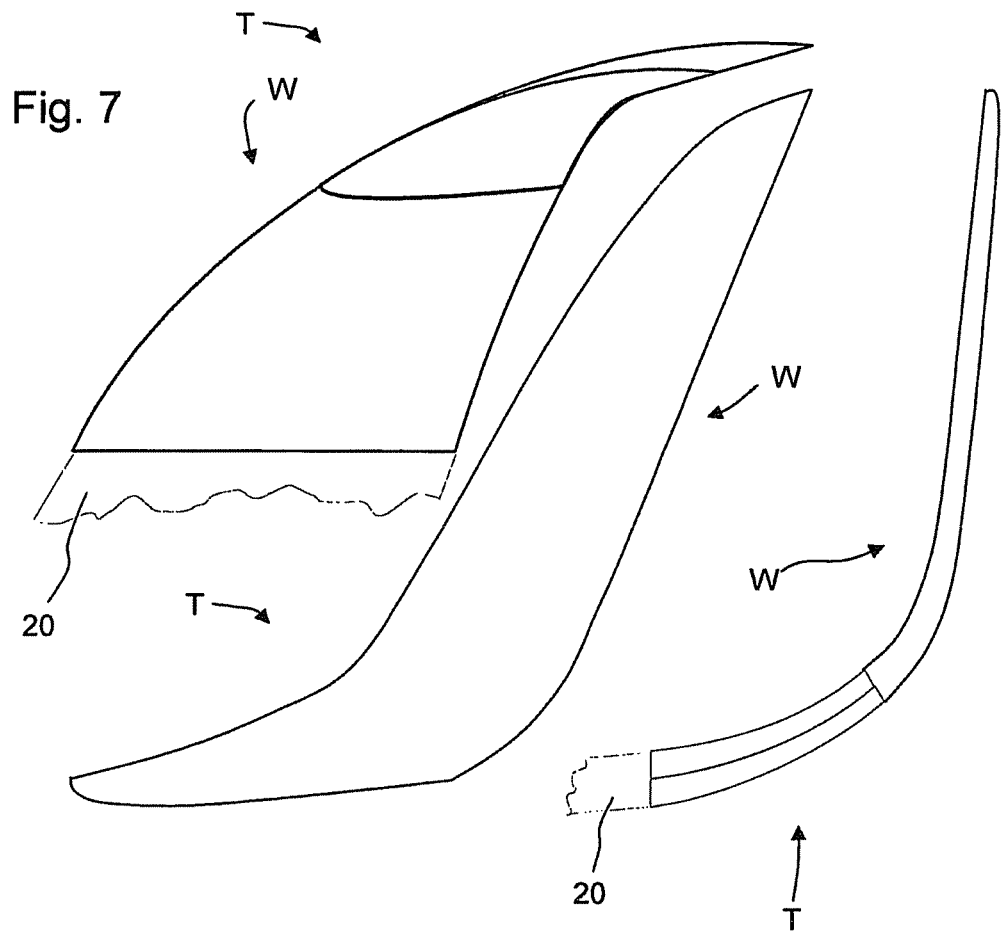

FIXED WING OF AN AIRCRAFT

CROSS-REFERENCE TO RELATED APPLICATION

This application is a continuation of and claims priority to PCT/EP2010/002250 filed Apr. 12, 2010, the entire disclosure of which is herein incorporated by reference.

TECHNICAL FIELD

The invention relates to a fixed wing of an aircraft.

BACKGROUND

Known from prior art are fixed wings with non-planar wing tip devices or wing tip shapes that differ in terms of their geometric shape and structural size so as to improve the aerodynamic efficiency of the fixed wing.

Known from DE 101 17 721 A1 is a wing tip extension for a wing with an upper and lower surface, along with a leading and trailing edge, with geometries of a kind that produce a continuous increase in the local dihedral angle, a steady increase in the sweep of both the leading edge and trailing edge, and a continuous decrease of the chord of the wing tip extension between a connection area for joining with the wing and the tip of the wing tip extension, and that cause the wing tip extension in the connection area to be essentially continuously in tangency joined with the wing. The literature offers a plurality of fixed wings with various wing shapes or winglets provided primarily to reduce aerodynamic drag, and hence to increase aerodynamic efficiency. Wing tip shapes can be defined as being part of the process of designing a new fixed wing or overall aircraft, or retrofitting an already existing aircraft with such a wing tip shape. In the latter case, the present wing tip shape geometry is replaced by another. In both instances, while designing the wing tip shape, the increase in aerodynamic efficiency must be balanced against any changes, often increases in the structural load, which is often expressed in a simplified manner using the wing root bending moment, and all resultant consequences with regard to aircraft weight. The evaluation of various tip shapes can yield different results due to the respective design scenario and boundary conditions.

Also known from general prior art is a so-called wing tip fence (WTF), which is comprised of two similarly dimensioned components and extends upward and downward, nearly perpendicular to the wing. To optimize the flow quality on the wing, wing tip shapes have been realized with continuously smooth transitions for the sweep and dihedral between the outer end of the main wing where the wing tip shape is situated and the wing tip shape.

SUMMARY

The object of the invention is to provide a fixed wing with an adapter portion that can in turn accommodate a wing tip device, whose size or other geometric or aerodynamic properties can be tuned to realize a broad performance spectrum for the aircraft. Another object of the invention is to provide a fixed wing with an adapter portion that can improve the aerodynamic performance of variants of one aircraft type, e.g. cargo or passenger variant of an aircraft type. The object of the invention is also to provide an adapter portion as well as a fixed wing with such an adapter portion, which make it possible to retrofit fixed-wing aircraft differing in terms of their dimensions and/or performance spectrum with a wing tip device for improving the aerodynamic properties of the fixed wing and the aircraft.

This object is achieved with the features claimed. Additional embodiments are indicated in the subclaims relating back to the latter.

In accordance with the invention, a fixed wing has a wing box with a main wing box area that extends over the main portion of the fixed wing in the spanwise direction. The main wing box area comprises the supporting structure of the main wing of the fixed wing. The main wing box area has a wing box adapter section, which viewed from the wing root forms an outer end area of the wing box, and makes up the supporting structure of an adapter section of the fixed wing. According to the invention, the fixed wing comprises the wing box adapter section or the adapter section for attaching a wider variety of wing tip shapes or winglets, and here itself still has optimized, even though sub-optimal, aerodynamic properties.

In order to achieve the known desired aerodynamic effects with the wing tip devices according to prior art as e.g. U.S. Pat. No. 5,348,253, WO 247979 A3 or WO 2008/061739 A1, the latter have a curved inner area that comprises the transition to the main wing, and an outer area that is extended as much as possible, meaning as viewed over the span of the wing tip device with a relatively small change in the dihedral angle. Realized as a result is the largest possible structural height of the wing tip device on the wing relative to the dimensions or span of the wing tip device, i.e., in relation to the longitudinal extension of the main portion of the main wing. As a consequence, the wings in prior art are optimized for the integration of a very specific wing tip device of this kind, so that they exhibit a relatively large change in the dihedral angle along a transitional section proceeding from the main area of the wing in the transitional area between the main portion of the fixed wing and the outer area of the wing tip device as viewed in the spanwise direction, so as to provide a relatively large structural height for the wing tip device relative to the outer end of the main wing as viewed in the direction of the wing thickness, while simultaneously only having to provide a relatively small change in the dihedral angle in the end area of the wing tip device.

During the design and configuration of wing tip devices, prior art provides that the latter be developed, tested and optimized as wing tip devices that are as close to planar as possible or nearly so, since the wing tip devices are usually optimized separately in a configuration step. "As close to planar as possible or nearly so" in this conjunction means that the respective wing tip device exhibits a slight change in the dihedral angle as viewed in its spanwise direction of at most about 15 degrees. This applies to both relatively small and relatively large wing tip shapes.

As opposed to the forms of realization known from prior art, the fixed wing according to the invention has an adapter section that forms a wing tip device or base wing tip device of the fixed wing, which has a relatively slight change in the dihedral angle. It is here provided that the dihedral angle of the base wing tip device continuously increases by an amount ranging between 20 and 45 degrees. In this case, the base wing tip piece extends between an outer rib of a base wing box section up to the outermost rib of a wing box section of the base wing tip device. The fixed wing according to the invention is designed in such a way that a wing tip device that optimizes the aerodynamic properties of the aircraft can be placed on the base wing tip device. Therefore, the base wing tip device in this respect represents an adapter section with a wing box adapter section, on which is attached a wing tip device that optimizes the main wing or main section of the wing. The fixed wing with the base wing tip device or the adapter section hence has sub-optimal aerodynamic properties, insofar as the base wing tip device is designed in such a way according to the invention that an optimizing wing tip device can be attached to the latter in order to optimize the aerodynamic properties of the fixed wing as a whole, for example with respect to certain aircraft configurations.

Configuring the transitional area according to the invention makes the fixed wing suitable in particular for use in the transonic velocity range.

According to the invention, this wing box adapter section can have secured to it a wing tip device optimized with respect to an aircraft variant or a special range of applications. A preferred embodiment of the invention provides that various wing tip devices can be secured to a respective wing box adapter section according to the invention. According to the latter, the fixed wing can be optimized for a special application by replacing a wing tip device already attached to the fixed wing with a corresponding wing tip device especially suited for the special application, thereby requiring little or no modifications on the fixed wing for this purpose.

Since the end area of the wing box adapter section is suitable for attaching wing tip devices of varying shape and size according to the invention, the fixed wing is hence also suitable as a fixed wing which, while having a sub-optimal design with respect to aerodynamic performance, still permits an aerodynamic optimization within specific limits by correspondingly adjusting the design of the fixed wing. In particular, this design of the adapter section allows the attachment of a wide variety of wing tip devices.

According to the invention, the fixed wing can hence also fly without a wing tip device, wherein the fixed wing still exhibits an improved aerodynamic performance by comparison to a conventionally planar fixed wing. In addition, it permits the attachment of wing tip devices that are relatively long and stretched out, and can vary in terms of size. The following dimensions are mentioned below as an example:

Relative to the half-span of the fixed wing, the height of a wing tip device can vary from 3% for a small wing tip device and 11% for a very large wing tip device, for example.

Therefore, the wing tip device provided according to the invention can be realized as a separate part, which is secured to the wing box adapter section at the outer end of a main wing, and thereby achieves an optimal aerodynamic efficiency, e.g., during a passenger flight, with only relatively slight, and hence economically relatively beneficial changes to the wing structure being required, if any at all.

The features of the adapter device according to the invention yield an increased performance for the fixed wing to which the wing tip device is secured, as well as for the entire aircraft with the fixed wing. The configuration of the adapter device according to the invention makes it possible to accommodate and integrate a navigation light along with a canopy to cover the latter.

Also achievable with the embodiments of the adapter device according to the invention is to keep the additional structural load acting on the wing low when attaching the adapter device to a wing in the course of retrofitting, and reduce it to a negligible level by correspondingly adjusting the design according to the invention to the circumstances of the respective individual case. This makes the adapter device according to the invention suitable in particular for retrofitting a wing of an existing aircraft with very slight modifications to the wing, if any at all. Provided according to the invention in particular is a fixed wing of an aircraft that exhibits a main wing extending over a half-span with a wing box comprised of spars extending along the spanwise direction of the main wing, a plurality of ribs arranged one after another viewed in the spanwise direction, and an outer skin, wherein the wing chord of the main wing at the location of the outermost rib of the main wing viewed from the wing root measures 5% to 15% of the half-span of the wing box, wherein the wing box is comprised of a main wing box area and a wing box adapter section, that forms the outer end area of the wing box, as viewed from the wing root, and is designed to secure a wing tip device, wherein the wing box adapter section extends from an outer rib of the main wing box section and over 2% to 10% of the half-span of the wing box up to an outer rib of the wing box adapter section forming the outermost rib of the main wing, One embodiment of the fixed wing according to the invention is configured as follows in its nominal state of construction:

The dihedral angle of the wing box adapter section that refers to the respective local spanwise direction continuously increases by at least 10 degrees from the outer rib of the main wing box section to the outermost rib of the wing box adapter section.

It can be provided according to the invention that the local sweep of the leading edge of the fixed wing increases by at least 5 degrees in the area of the wing box adapter section.

Another embodiment of the invention provides in particular that the dihedral angle of the wing box adapter section referring to the respective local spanwise direction continuously increases by between 10 and 60 degrees from the outer rib of the wing box base section up to the outermost rib of the wing box adapter section.

In a special exemplary embodiment in which the technical effects achievable according to the invention can be achieved in an especially favorable manner, the fixed wing is designed in such a way that the dihedral angle of the wing box adapter section referring to the respective local spanwise direction increases continuously by between 20 and 45 degrees from the outer rib of the wing box base section up to the outermost rib of the wing box adapter section.

It can alternatively or additionally be provided that the local sweep of the leading edge of the fixed wing increases by between 10 and 45 degrees in the area of the wing box adapter section. In a special exemplary embodiment in which the technical effects achievable according to the invention can be achieved in an especially favorable manner, the fixed wing is designed in such a way that the local sweep of the leading edge of the fixed wing increases by between 10 and 35 degrees in the area of the wing box adapter section.

According to the invention, the outer end of the wing box adapter section can have a connection device for attaching a wing tip device. In particular, the connection device can be provided on the outer rib of the wing box adapter section.

According to the invention, the wing box adapter section forming the outer end area of the wing box can be designed to attach a wing tip device, wherein the wing tip device is secured with an inner rib to an outer rib of the main wing box section.

In this case, it can further be provided according to the invention that the connection device is designed at the outer end of the wing box adapter section viewed from the wing root as a positive locking part, so as to positively join a wing tip device to be coupled with the wing box adapter section to the wing box adapter section In addition, the invention can provide that the local sweep of the trailing edge of the fixed wing increase by at least 5 degrees in the area of the wing box adapter section.

The invention can also provide that the local sweep of the trailing edge of the fixed wing increase by a maximum of 20 degrees in the area of the wing box adapter section.

In an advantageous embodiment of the wing box adapter section, the dihedral angle of the wing box adapter section referring to the respective local spanwise direction can continuously increase by more than 20 degrees, but not by more than 45 degrees, from the outer rib of the main wing box section up to the outermost rib of the wing box adapter section.

In an advantageous embodiment of the wing box adapter section, the local sweep of the leading edge of the fixed wing can increase by more than 10 degrees, but not by more than 35 degrees, in the area of the wing box adapter section.

In order to couple the wing box adapter section to the main wing box area, the invention provides that the outer end of the main wing box section as viewed from the wing root along with the inner end of the wing box adapter section adjacent thereto can each exhibit a connection device for establishing a coupling device to couple the wing box adapter section to the main wing box area.

The coupling device can here be designed in such a way that, in order to create the connection device, the outer rib of the main wing box section and the inner rib of the wing box adapter section each have holes, in particular drill holes, and/or slots for accommodation of connection elements by which the wing box adapter section can be coupled to the main wing box area, wherein the connection elements are provided for securing the outer rib to the inner rib so as to couple the main wing box section with the wing box adapter section. In addition, the coupling device can be designed in such a way as to separate the latter by destroying the connection elements, or alternatively to enable separation of the latter without any destruction.

In these embodiments, the inner rib of the wing box adapter section and the outer rib of the main wing box section can be designed in such a way as to positively intermesh and engage when secured to each other.

In addition, it can be provided in the fixed wing of the invention that the wing chord of the fixed wing is reduced at least to 95% and at most to 45% in the area of the wing box adapter section from the outer rib of the main wing box section to the outermost rib of the wing box adapter section.

The parameter values indicated herein for the description of the fixed wing according to the invention, e.g., the values for the dihedral angle or the local sweep of the leading or trailing edge of the fixed wing, relate to the fixed wing in its nominal state of construction, and hence to the fixed wing not exposed to an external load.

In another aspect of the invention, a fixed wing is provided with an adapter device according to the invention.

BRIEF DESCRIPTION OF DRAWINGS

Exemplary embodiments of the invention will be described below based on the attached figures, in which:

FIG. 3 shows a diagrammatic rear view of an exemplary embodiment of the wing box adapter section and the wing tip device according to the invention, FIG. 4 shows a diagrammatic top view of a first exemplary embodiment of the fixed wing with a wing tip adapter section according to the invention and a wing tip device secured thereto, denoted by dashed lines, FIG. 5 shows an exploded view of an exemplary embodiment of an outer part of the fixed wing according to the invention with a wing adapter section, FIGS. 6a, 6b and 6c each show perspective views of various embodiments W1, W2 or W3 of the wing tip device W, which are suitable for connection to a fixed wing with a wing adapter section according to the invention, and FIG. 7a top view of an embodiment of the fixed wing according to the invention, FIG. 8 a side view of the embodiment of the fixed wing according to FIG. 7 and FIG. 9 a rear view of the embodiment of the fixed wing according to FIG. 7.

DETAILED DESCRIPTION OF DRAWINGS

Figure 1:
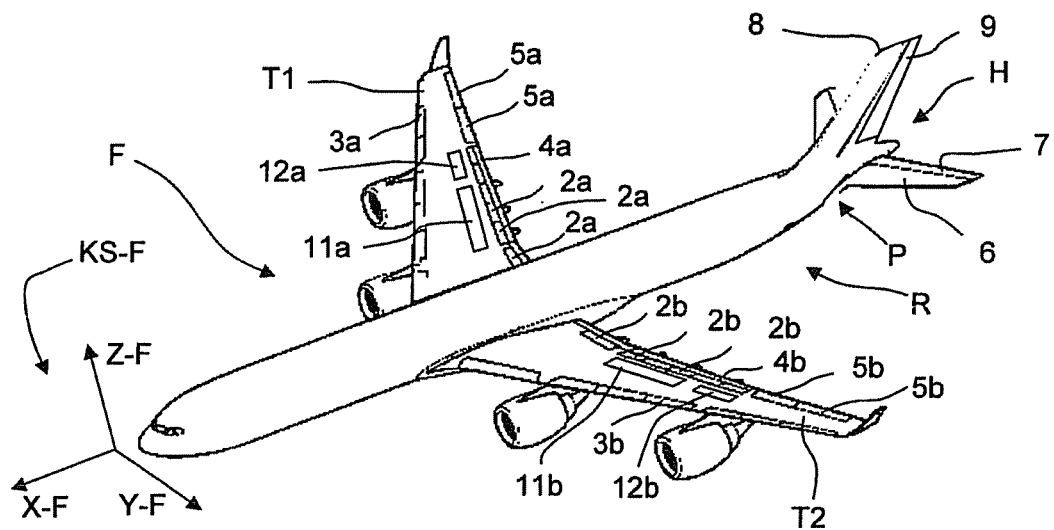
FIG. 1 shows a diagrammatic, perspective view of an aircraft with an exemplary embodiment of the wing tip device according to the invention.

The exemplary embodiment shown on FIG. 1 of a regular aircraft F in which the invention can be used in its usual form has two fixed wings 1a, 1b each having at least one aileron 5a or 5b. Each fixed wing 1a, 1b of the aircraft depicted on FIG. 1 also has three leading edge lifting units 3a, 3b and three trailing edge lifting units 4a, 4b as high-lift flaps. As an option, the fixed wings 1a, 1b can each have a plurality of spoilers 2a, 2b. In addition, the aircraft F has a tail assembly H with a rudder unit 8 with a rudder 9 and an elevator unit 6 with at least one elevator 7. The elevator unit 6 can be used as a T-shaped tail unit, for example, as depicted on FIG. 1, or as a transverse tail unit.

The aircraft F according to the invention can also have a different shape than the aircraft F shown on FIG. 1. For example, the aircraft according to the invention can also be a monoplane with high set wings or an all-wing aircraft. The aircraft can also be an aircraft that has canards instead of an elevator unit.

FIG. 1 records a coordinate system KS-F relating to the aircraft with an aircraft longitudinal axis X-F, an aircraft transverse axis Y-F and an aircraft vertical axis Z-F.

Figure 2:
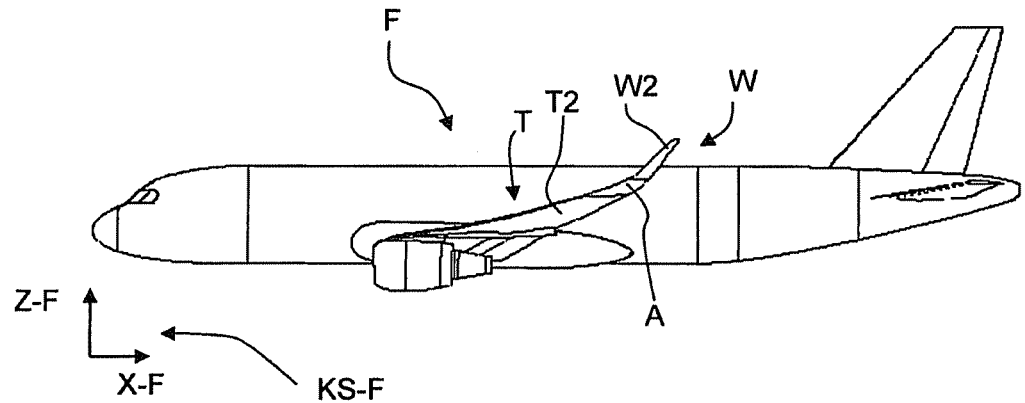
FIG. 2 shows a diagrammatic side view of an aircraft with an exemplary embodiment of the fixed wing according to the invention with a wing adapter section.

Each fixed wing 1a, 1b has allocated to it a fixed wing coordinate system KS-T with an axis S-T for the spanwise direction, an axis T-T for the chord direction and an axis D-T for the thickness direction of the fixed wing (FIG. 2). The coordinate system KS-T of the fixed wing is a local coordinate system, and oriented in such a way based on a definition according to the invention that the local fixed wing chord direction FT runs parallel to the chord direction of the fixed wing T in the X-direction or longitudinal direction of the aircraft coordinate system KS-F, and that the wing thickness direction FD of the coordinate system KS-T of the fixed wing T runs parallel to the Z-direction of the aircraft coordinate system KS-F or the direction of the vertical axis Z of the aircraft F. The orientation of the axes and the origin of the local coordinate system KS-T of the fixed wing T can be defined alternatively according to the invention based on the smallest cross sectional surface of the fixed wing T that respectively arises in each point of the fixed wing T, wherein the origin of the local coordinate system KS-T is the centroid that arises for and lies within the respective cross sectional area, and the local fixed wing thickness direction FD as well as the local fixed wing chord direction FT lie in the respectively smallest cross sectional area.

FIGS. 3, 4, 5 and 6a to 6c show an embodiment of the wing according to the invention in the form of a right fixed wing T1 viewed in the aircraft longitudinal direction X-F. FIGS. 3, 4, 5 and 6a to 6c also record the aircraft coordinate system KS-F as well as the coordinate system KS-T of the fixed wing T. The explanation provided below with regard to the right fixed wing T1 can be applied in a similar way to the left fixed wing T2.

The fixed wing T according to the invention or its main wing M, i.e., the fixed wing T without its flaps or additional wings, as a whole exhibits an upper side S1 situated on the suction side of the fixed wing, and a lower side S2 situated opposite the latter and on the pressure side of the fixed wing T, a leading edge EL and a trailing edge ET, and is comprised of a wing base area 10 and a wing adapter section 20. The fixed wing T comprises a wing box K, to which is attached the outer skin of the wing forming the flow surface of the fixed wing. The wing box K comprises spars H extending along the spanwise direction of the main wing and a plurality of ribs that run one in back of the other viewed in the spanwise direction and extend along the wing chord direction T-T. The wing box K depicted on FIG. 4 is designed with two spars H, for example, specifically with a front main spar H1 running along the leading edge EL, and a rear main spar H2 running along the trailing edge ET. Several ribs R that each run in the wing chord direction T-T are secured to the main spars H1, H2. For example, the ribs are marked R1, R2, R3, R4 and R5 on FIG. 4. The main spars H1, H2 can also be realized in a way other than shown on FIG. 4, for example, consist of several parts arranged one in back of the other viewed in the spanwise direction S-T of the fixed wing T. The ribs R can also be designed differently than shown diagrammatically on FIG. 4. For example, the ribs do not have to extend between the two outer spars or main spars H1, H2, but rather the fixed wing T can be designed in such a way that the latter extend between two adjacent spars. The outer skin of the fixed wing T is secured to several or all spars and/or ribs of the fixed wing.

According to the invention, the wing box K consists of a wing box base section or wing box main area K10 forming the main wing section 10, and of a wing box adapter section K20 that comprises the outer end area of the wing box K viewed from the wing root and forms the wing adapter section 20.

According to the invention, the wing box adapter section K20 is designed for the attachment of a wing tip device or winglet W. For illustrative purposes, dashed lines on FIG. 4 depict the outlines of a wing tip device or winglet W arranged at the outer end of the wing box adapter section K20. A wing tip device W that can be secured to and detached from the wing box adapter section K20 is depicted in these figures for a right hand wing as viewed in relation to the flight direction or opposite the longitudinal axis X of the aircraft.

According to the invention, it can be provided in particular that the outer end of the wing box adapter section K20 has a connection device for attaching a wing tip device W. The wing box adapter section K20 has a first inner end 21 and one outer end 22 as viewed in the spanwise direction S-T. The outer end 22 of the wing box adapter section K20 forms the end span wise of the fixed wing T that is on the outside as viewed from the wing root. The wing adapter section 20 to which the wing box adapter section K20 belongs has a leading edge 23, which is part of the leading edge EL of the entire fixed wing T, and a trailing edge 24, which is part of the trailing edge of the entire fixed wing T.

Another embodiment of the invention provides that the connection device for joining a wing tip device W to the wing box adapter section K20 is formed on the outermost rib R5 of the wing box adapter section K20 as viewed from the wing root. The outermost rib R5 itself can here be structurally designed in such a way that a wing tip device W can be mounted thereto. In addition, the connection device can be realized according to the invention by designing the outer end as viewed from the wing root as a positive locking part, in order to positively join a wing tip device W to be coupled with the wing box adapter section K20 with the wing box adapter section K20. Therefore, the outer rib R5 of the wing box adapter section K20 and the inner rib of the wing tip device W can be designed according to the invention in such a way that the latter positively intermesh when being attached to each other. In this case, the outer rib R5 of the wing box adapter section K20 hence has a shape surface that faces the outside or a wing tip device W to be attached.

In general, the invention can provide that the outer end of the wing box main section K10 as viewed from the wing root along with the inner end of the wing box adapter section K20 adjacent thereto each have a connection device for creating a coupling device to couple the wing box adapter section K20 to the wing box main area K10. The coupling device can be realized in particular by a connection device on the outer end of the wing box main section K10, in which the outer rib of the wing box main section K10 along with the inner rib of the wing box adapter section K20 each have drill holes and/or slots for accommodation of connection elements by which the wing box adapter section can be coupled to the main wing box area. The connection elements are provided for attaching the outer rib to the inner rib in order to couple the wing box main section K10 with the wing box adapter section K20.

In the exemplary depiction on FIG. 4, the wing box adapter section K20 has an outermost rib R5, a central rib R4 and an innermost rib R3 as viewed from the wing root. The wing box adapter section K20 can be designed as a separate component, which is joined to the main wing. As an alternative, the wing box adapter section K20 can be designed as an integral, and not separate, component of the fixed wing T. In the depiction on FIG. 4, the wing box adapter section K20 is designed as a separate component of the fixed wing T, and the innermost rib R3 of the wing box adapter section K20 is joined with an outermost rib R2 of the wing box main section K10. The innermost rib R3 of the wing box adapter section K20 and the outermost rib R2 of the wing box main section K10 can here directly abut. As an alternative, the innermost rib R3 of the wing box adapter section K20 and the outermost rib R2 of the wing box main section K10 can be directly attached to each other. According to the invention, it can be provided in particular that the wing box adapter section K20 that forms the outer end area of the wing box is designed for attaching a wing tip device W. In particular the wing box adapter section K20 with an inner rib can here be connected with an outer rib of the wing box main section K10.

The coupling device for coupling the wing box adapter section K20 to the wing box base section K10 can here in particular be designed in such a way that the latter is separated by destroying the connection elements. As an alternative, the coupling device can be designed in such a way as to set up the coupling device so that it can be non-destructively separated.

The wing box adapter section K20 is designed for attaching a wing tip device by having the wing box adapter section K20 extend from an outer rib of the wing box main section K10 and over 2% to 10% of the half-span of the wing box K up to an outer rib of the wing box adapter section K20 forming the outermost rib of the main wing.

With the fixed wing according to the invention in its nominal state of construction, the dihedral angle of the wing box adapter section K20 referring to the respective local spanwise direction continuously increases by at least 10 degrees from the outer rib of the wing box main section K10 to the outermost rib of the wing box adapter section K20. As an alternative or in addition, the fixed wing according to the invention can be designed in such a way that, in its nominal state of construction, the local sweep of the leading edge of the fixed wing increases by at least 5 degrees in the area of the wing box adapter section K20.

The fixed wing according to the invention with a wing box adapter section that is designed for the attachment of a wing tip device can for this purpose have a connection device for the attachment of a wing tip device, with its continuous increase of the dihedral angle and/or the local sweep of the leading edge of the fixed wing, makes it possible to attach a relatively wide range of wing tip devices. With respect to the wing tip devices W, W1, W2, W3 to be attached according to the invention, it is provided that the local dihedral angle of the wing tip device W, W1, W2 continuously increases or decreases from the inner end E1 to the outer end E2 W. The wing tip device W, W1, W2 or its second end E2 is upwardly directed with the dihedral angle increasing, or the wing tip device W, W1, W2 or its second end E2 are downwardly directed with the dihedral angle decreasing.

In terms of the invention, "top" proceeding from the fixed wing T is to be understood as the direction leading away from the top side T1 of the fixed wing T, or the positive Z-direction of the aircraft coordinate system KS-F, or the positive wing thickness direction of the fixed wing coordinate system KS-T.

One embodiment of the fixed wing according to the invention provides that, given a continuous increase in the dihedral angle of the wing box adapter section K20 referring to the respective local spanwise direction from the outer rib of the wing box main section K10 up to the outermost rib of the wing box adapter section K20, this increase is at least 10 degrees and at most 60 degrees. In a preferred embodiment, this increase in the dihedral angle of the wing box adapter section K20 referring to the respective local spanwise direction from the outer rib of the wing box main section K10 up to the outermost rib of the wing box adapter section K20 measures at least 20 degrees and at most 45 degrees.

The dihedral angle or the local dihedral angle can refer to a first reference line of the fixed wing according to the invention that runs along the longitudinal direction L, and optionally to the wing tip device W attached thereto. The local dihedral-angle is here the angle between the tangent running along the first reference line at the point where the respective dihedral-angle is determined, and a second reference line or datum line. The second reference line can in particular be defined by the connecting line of the centroids of the cross sectional areas of the fixed wing T or the wing tip device W, which lie in the X-Z plane of the aircraft coordinate system KS-F. The second reference line can in particular be a line running parallel to the Y-axis of the aircraft coordinate system KS-F. The second reference line can also be the leading edge line or the trailing edge line of the wing or the high lift flaps thereof.

According to the invention, the longitudinal direction L can in particular be identical with the mentioned reference line. The longitudinal direction L can be the connecting line of the centroids of these areas with the smallest cross sectional areas, in which lie the respective local wing tip device thickness direction D-W and the local wing tip device chord direction T-W or the local fixed wing thickness direction D-T as well as the local fixed wing chord direction T-T.

In order to describe the shape of the wing tip device W to be secured to the fixed wing according to the invention, reference is made to a local coordinate system KS-W for the wing tip device W to be secured to the fixed wing, which is defined similarly to the described local coordinate system KS-T for the fixed wing T, and which is formed locally at the points marking the progression of the longitudinal direction L of the wing tip device W. The local coordinate system KS-W for the wing tip device W has the local wing tip device spanwise direction S-W, the local wing tip device thickness direction D-W and the wing tip device chord direction T-W as the axes. The orientation of the coordinate system can be defined similarly to the local fixed wing coordinate system KS-T as described there based on the aircraft coordinate system, or alternatively based on the smallest cross sectional area of the fixed wing T arising at each point of the fixed wing T.

Relative to the spanwise direction SW of the wing T on which the wing tip device is arranged, the wing tip device W has an inner end E1 to form a wing tip device connection, and an outer end that forms the wing tip, meaning the second end E2 of the adapter section 20, and lengthens the fixed wing T in terms of its spanwise direction SW proceeding from the outermost end of the fixed wing T to which the wing tip device W is secured. The wing tip device W has a trailing edge W-ET and a leading edge W-EL, which each run between the first end E1 and the second end E2.

Shown on FIGS. 6a to 6c are various embodiments W1, W2 and W3 of the wing tip device W, which are suitable for connection to a fixed wing T with a wing adapter section 20. The fixed wing T according to the invention is particularly suitable for the attachment of wing tip devices with a local dihedral angle that continuously increases from the inner end E1 up to the outer end E2, as shown in the embodiments on FIGS. 6a, 6b and 6c, or decreases. In one exemplary embodiment of the wing tip device W, the upper side and/or the lower side of the wing tip device W can be continuous in tangency or curvature in all directions. In a special exemplary embodiment, the upper side and/or the lower side of the wing tip device W can also exhibit a kink at one or more locations, so that the upper side and/or the lower side are at least continuous at a given point.

In an exemplary embodiment of the fixed wing according to the invention, the wing chord of the fixed wing T is reduced at least to 95% and at most to 45% in the area of the wing box adapter section K20 from the outer rib of the wing box main section K10 up to the outermost rib of the wing box adapter section K20 relative to the wing chord of the fixed wing at the location of the outer rib of the wing box main section K10.

This embodiment of the fixed wing T is especially advantageous for the attachment of a wing tip device W shown as wing tip device W3 on FIG. 6c, whose local sweep angle of the trailing edge W-ET ("trailing edge sweep") and whose local sweep angle of the leading edge ("leading edge sweep") W-EL continuously increases along its progression from the inner end E1 up to the outer end E2 of the wing tip device W3, or at least up to a distance or area before the outer end E2.

Such a distance or area before the outer end E2 denotes a partial area B3 that generally extends at most over 8% of the length of the wing tip device W; W1, W2; W3 running in the longitudinal direction L. For example, the sweep angle of the leading edge W-EL can again taper off in the partial area B3. However, another exemplary embodiment of the invention can also provide that the area B3 not be present.

The wing tip device W to be attached to the fixed wing can be designed in such a way in conjunction with the wing box adapter section to form a fixed wing with a leading edge having two intermediate points WP1, WP2 representing way points of the leading edge (FIGS. 6a and 6b; wing tip devices W1 and W2). The intermediate points WP1, WP2 make it possible to divide the wing tip device W into two spanning areas B1, B2 (possibly including B3), wherein the interfaces of each area can be defined in such a way as to run along the X-Z plane of the aircraft coordinate system KS-F (FIG. 4) or along the local wing tip device thickness direction D-W of the local wing tip device chord direction T-E. The wing adapter section 20 lies between the first end 21 of the wing adapter section 20 and the first way point WP1, the first area B1 lies between the first way point WP1 and the second way point WP2, and the second area B2 lies between the second way point WP2 and the second end E2 of the wing tip device W1 or W2.

The position of the first way point WP1 can be situated at the outer or second end 22 of the wing adapter section 20 (FIG. 6a, 6b), or remote from the second end 22. The features provided by the invention with respect to the progression of the leading edge of the wing tip devices W1 and W2, and here in particular the change in the sweep in the third area B3, make it possible to use the wing adapter section 20 according to the invention to effect variations in the configuration of the wing tip device W as a whole, so that the aerodynamic effects achievable for the fixed wing T and aircraft F can be influenced.

The shape of the fixed wing T according to the invention allows the realization of a geometric shape of the wing tip device W that is aerodynamically efficient with small structural impact. In addition to the usual design parameters of geometric twist and camber, this is achieved by the significant reduction in local profile chords in the inner area span wise of the wing tip device or wing box adapter section 20. Due to the twice-changed local sweep angle of the leading edge W-EL the spanwise extension of the wing tip device W1, W2 according to the invention relative to a known wing tip shape with a continuously increasing leading edge sweep can be significantly extended. As a result, aerodynamic advantages relating to induced drag and profile drag can be derived from both the span effect and the reduction in the wetted surface. At the same time, a lower structural load is achieved on the wing F by comparison to previous solutions as the result of the geometric form of the wing tip device W1, W2 provided by the invention, while maintaining the same aerodynamic efficiency.

On the other hand, if the structural advantage is balanced by an additional geometric height and/or spanwise extension on the wing tip device W according to the invention, an adjusted aerodynamic load distribution despite a larger wetted surface yields a total drag gain in comparison to a known wing tip device.

The wing tip device W can be directly secured to the fixed wing T. In this case, abutting surfaces or lines of the fixed wing T and the wing tip device W can form an edge line or a kink.

It can be provided in particular in one aspect of the invention that the wing tip device chord running in the local wing tip device chord direction T-W and the wing tip device thickness running along the local wing tip device thickness direction D-W continuously decrease along the wing tip device longitudinal direction L.

According to the invention, a "continuous" decrease or "continuous" increase of a fundamental quantity is understood to mean that the fundamental quantity, meaning the wing tip thickness in the aforementioned example, increases or decreases monotonously along a respectively relevant reference line. The progression of the increase or decrease of the parameter can also exhibit a kink.

To this end, the fixed wing according to the invention can be configured in such a way that the local sweep of the leading edge of the fixed wing T increases by at most 45 degrees in the area of the wing box adapter section K20.

As an alternative or in addition, it can be provided that the local sweep of the trailing edge of the fixed wing T increases by at least 5 degrees in the area of the wing box adapter section K20.

As an alternative or in addition, it can be provided that the local sweep of the trailing edge of the fixed wing T increases by at most 20 degrees in the area of the wing box adapter section K20.

The wing tip device W according to the invention can be used in particular for retrofitting or refitting already existing aircraft, for which aerodynamic performance is to be improved without any structural changes, or with only marginal structural changes, to the fixed wing T.

FIGS. 7, 8 and 9 show various perspective views of an embodiment of the fixed wing according to the invention, wherein the dihedral angle and the leading edge angle increase by about 30 degrees for its adapter section 20. In addition, the wing chord at the outer rib of the adapter section 20 measures about 49% of the wing chord on the outer edge of the wing box.

The invention claimed is:

1. A wing of an aircraft that exhibits a main wing extending over a half-span,
    wherein a wing chord of the main wing (M) at a location of an outermost rib (R5) of the main wing (M) viewed from the wing root measures 5% to 15% of the half-span of the main wing (M),
    wherein the main wing (M) is comprised of a wing base area (10) and a wing adapter section (20), that forms the outer end area of the main wing (M), as viewed from the wing root, and is designed to secure a wing tip device (W1, W2, W3),
    wherein the wing adapter section (20) extends from an outer rib (R3) of the wing base area (10) and over 2% to 10% of the half-span of the main wing (M) up to an outer rib (R5) of the wing adapter section (20) forming the outermost rib (R5) of the main wing (M),
    characterized in that the dihedral angle of the wing adapter section (20) that refers to the respective local spanwise direction continuously increases by between 10 and 60 degrees from the outer rib (R3) of the wing base area (10) up to the outermost rib (R5) of the wing adapter section (20).

2. The wing according to claim 1, characterized in that the wing adapter section (20) is an integral part of the main wing (M).

3. The wing according to claim 1, characterized in that the wing adapter section (20) is a separate part of the main wing (M) attached thereto.

4. The wing according to claim 1, characterized in that the main wing (M) comprises a wing box (K) comprised of spars extending along the spanwise direction of the main wing (M), a plurality of ribs (R1, R2, R3, R4, R5) arranged one after another viewed in the spanwise direction, and an outer skin,
    wherein the wing chord of the main wing (M) at the location of the outermost rib (R5) of the main wing (M) viewed from the wing root measures 5% to 15% of the half-span of the wing box (K),
    wherein the wing box (K) is comprised of a wing box base section (K10) and a wing box adapter section (K20), that forms the outer end area of the wing box (K), as viewed from the wing root, and is designed to secure a wing tip device (W1, W2, W3),
    wherein the wing box adapter section (K20) extends from an outer rib (R2) of the wing box base section (K10) and over 2% to 10% of the half-span of the wing box (K) up to an outer rib (R5) of the wing box adapter section (K20) forming the outermost rib (R5) of the main wing, characterized in that the dihedral angle of the wing box adapter section (K20) that refers to the respective local spanwise direction continuously increases by between 10 and 60 degrees from the outer rib (R2) of the wing box base section (K10) up to the outermost rib (R5) of the wing box adapter section.

5. The fixed wing according to claim 1, characterized in that the local sweep of the leading edge of the fixed wing in its nominal state of construction increases by between 10 and 45 degrees in the area of the wing box adapter section.

6. The fixed wing according to claim 1, characterized in that the outer end of the wing box adapter section (K20) has a connection device for securing a wing tip device.

7. The fixed wing according to claim 1, characterized in that the wing box adapter section that forms the outer end area of the wing box is designed for the attachment of a wing tip device, wherein the wing tip device with an inner rib is joined to an outer rib of the wing box base section (K10).

8. The fixed wing according to claim 6, characterized in that the connection device is designed as a positive-locking part on the outer end as viewed from the wing root, so as to positively attach a wing tip device to be coupled with the wing box adapter section to the wing box adapter section.

9. The fixed wing according to claim 1, characterized in that the local sweep of the leading edge of the fixed wing increases by at most 45 degrees in the area of the wing box adapter section.

10. The fixed wing according to claim 1, characterized in that the local sweep of the trailing edge of the fixed wing increases by at most 5 degrees in the area of the wing box adapter section.

11. The fixed wing according to claim 1, characterized in that the local sweep of the trailing edge of the fixed wing increases by at most 20 degrees in the area of the wing box adapter section.

12. The fixed wing according to claim 1, characterized in that the outer end of the wing box base section (K10) as viewed from the wing root along with the inner end of the wing box adapter section (K20) adjacent thereto each have a connection device for coupling the wing box adapter section to the wing box base section (K10).

13. The fixed wing according to claim 12, characterized in that the coupling device is designed in such a way that, in order to create the connection device, the outer rib of the wing box base section (K10) and the inner rib of the wing box adapter section each have boreholes, and that connection elements are provided for securing the outer rib to the inner rib so as to couple the main wing box section (K10) with the wing box adapter section.

14. The fixed wing according to claim 13, characterized in that the coupling device is designed in such a way as to be separated by destroying the connection elements.

15. The fixed wing according to claim 13, characterized in that the connection is configured in such a way that the coupling device is designed in such a way as to be separated without any destruction.

16. The fixed wing according to claim 12, characterized in that the inner rib of the wing box adapter section and the outer rib of the wing box base section (K10) are designed in such a way as to positively intermesh and engage when secured to each other.

17. The fixed wing according to claim 1, characterized in that the wing chord of the fixed wing is reduced at least to 95% and at most to 45% in the area of the wing box adapter section from the outer rib of the wing box base section (K10) up to the outermost rib of the wing box adapter section.

* * * * *

UNITED STATES PATENT AND TRADEMARK OFFICE
CERTIFICATE OF CORRECTION

Page 1 of 1

PATENT NO. : 9,056,671 B2
APPLICATION NO. : 13/650457
DATED : June 16, 2015
INVENTOR(S) : Heller et al.

It is certified that error appears in the above-identified patent and that said Letters Patent is hereby corrected as shown below:

On title page, item (63) Related U.S. Application Data
Add --Continuation of application No. PCT/EP2010/002250, filed on April 12, 2010.--

Signed and Sealed this
Eighteenth Day of August, 2015

Michelle K. Lee
*Director of the United States Patent and Trademark Office*